UNITED STATES PATENT OFFICE.

H. C. S. OTTO, OF NEW YORK, N. Y.

IMPROVED MEDICAL COMPOUND.

Specification forming part of Letters Patent No. 101,305, dated March 29, 1870.

*To all whom it may concern:*

Be it known that I, HEINRICH CHRISTIAN SOPHRAN OTTO, of the city, county, and State of New York, did invent a new and Improved Liniment for Lameness and Rheumatism; and I do hereby declare the following to be a full, clear, and exact description thereof.

I take the following ingredients and mix them well together: four ounces spiritus natrum muriaticum, (being common salt dissolved in alcohol;) one-fourth ounce spiritus urtica urens; one-fourth ounce spiritus rosmarini; three drams spiritus camphoratus; one and one-fourth ounce spiritus saponatus; twenty grains ammoniacum causticum solutium.

I then let the mixture stand for about twelve days in a covered vessel, when it is ready for use.

I have found by experience that the said mixture is of good effect in cases of lameness and rheumatism.

It is used by rubbing it on the suffering parts three times a day.

What I claim as new, and desire to secure by Letters Patent, is—

The liniment for lameness and rheumatism herein described, consisting of the ingredients heretofore mentioned, made in the manner and for the purpose substantially as described.

H. C. S. OTTO, DR.

Witnesses:
CHS. WEHLE,
HENRY WEHLE.